United States Patent [19]
Mian et al.

[11] 3,919,193
[45] Nov. 11, 1975

[54] 3-DEAZAGUANOSINE AND DERIVATIVES THEREOF

[75] Inventors: Abdul M. Mian; Roland K. Robins, both of Santa Ana, Calif.

[73] Assignee: ICN Pharmaceuticals, Irvine, Calif.

[22] Filed: July 6, 1973

[21] Appl. No.: 377,079

[52] U.S. Cl.......... 260/211.5 R; 195/28 N; 424/180
[51] Int. Cl.²........................................ C07H 19/04
[58] Field of Search ....................... 260/211.5 R

[56] References Cited
UNITED STATES PATENTS

| | | | |
|---|---|---|---|
| 3,354,160 | 11/1967 | Duschinsky et al. | 260/211.5 R |
| 3,708,469 | 1/1973 | Vorbruggen et al. | 260/211.5 R |

*Primary Examiner*—Johnnie R. Brown
*Attorney, Agent, or Firm*—William Thomson; William C. Steffin; Kay H. Boswell

[57] ABSTRACT

3-Deazaguanosine and related compounds, useful as antiviral agents, are disclosed.

17 Claims, No Drawings

3-DEAZAGUANOSINE AND DERIVATIVES THEREOF

BACKGROUND OF THE INVENTION

During the past decade, many nucleoside analogs have been found to exhibit good antitumor and antiviral activities. Among the presently known synthetic nucleosidic antiviral agents, the more important generally are considered to be 5-iodo-2'-deoxyuridine (IDU), 9-β-D-arabinofuranosyladenine (ara-A) and 1-β-D-arabinofuranosylcytosine (ara-C). These compounds, however, are only active against a limited spectrum of viruses which does not include those causing respiratory diseases in man (influenza). The only mucleosidic analog of which we are aware that is active against these respiratory disease viruses is 1-β-D-ribofuranosyl-1,2,4-triazole-3-carboxamide which is described in copending U.S. Pat. application, Ser. No. 240,252, filed Mar. 31, 1972, now U.S. Pat. No. 3,798,209 entitled 1,2,4-Triazole Nucleosides, which application is a continuation-in-part of Ser. No. 149,017, filed June 1, 1971, now abandoned, entitled 1,2,4-Triazole Nucleosides, and assigned to the same assignee as this application.

Certain derivatives of this latter compound have also been found to have significant antiviral activity, as have the triazole bases, 1,2,4,-triazole-3-carboximide and 1,2,4-triazole-3-thiocarboxamide. Even with the advent of such compounds, however, and the discovery of their antiviral efficacy, there remains a need for compounds which are capable of inhibiting effectively virus infections, especially respiratory disease viruses.

Nucleosides, in vivo, are metabolized to their corresponding mono or poly phosphates. A major obstacle in the use of nucleoside analogs in chemotherapy, however, is the emergence of cellular resistance to such compounds, as the invasive cells exhibit a low level of kinase or pyrophosphorylase activity and consequently do not produce effective inhibitors. While this problem might be overcome by utilizing nucleoside phosphates, such derivatives often fail to pass through the cellular membrane or are rapidly degraded in the intercellular fluid and thus are ineffective as inhibitors.

In view of the foregoing considerations, it is clearly desirable to have a nucleosidic analog which is capable of effectively inhibiting the development of virus infections and which also possesses superior solubility than presently known antiviral agents. To provide such a compound, however, which not only has acceptable activity but is also capable of penetrating the cellular membrane and contacting the virus infection in effective concentrations, is exceedingly difficult.

With the foregoing considerations and need in mind, we determined to synthesize 3-deazaguanosine and related compounds and to investigate their antiviral capability.

SUMMARY OF THE INVENTION

The present invention is thus directed to compounds of the structure.

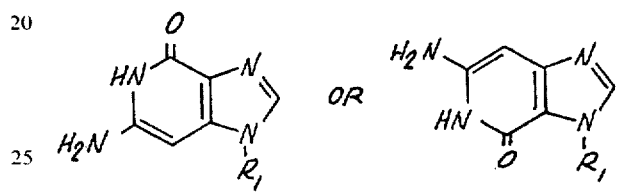

wherein $R_1$ is β-D-ribofuranose or 2',3',5'-O-acylated analogs thereof.

DETAILED DESCRIPTION OF THE INVENTION

The compounds of this invention may be prepared in accordance with the following schematic representation, as set forth in the illustrative examples which also follow, in which temperatures and melting points are expressed in degrees Centigrade. As thus illustrated, the compounds may be prepared from 5(4)-methoxycarbonylimidazole-4(5)-acetonitrile utilizing a high temperature fusion process with a protected ribofuranose, or conversion to its silylated derivative and reaction with a protected ribofuranose in the presence of stannic chloride or alternatively, the compounds may be prepared from 3-deazaguanine by direct glycosidation.

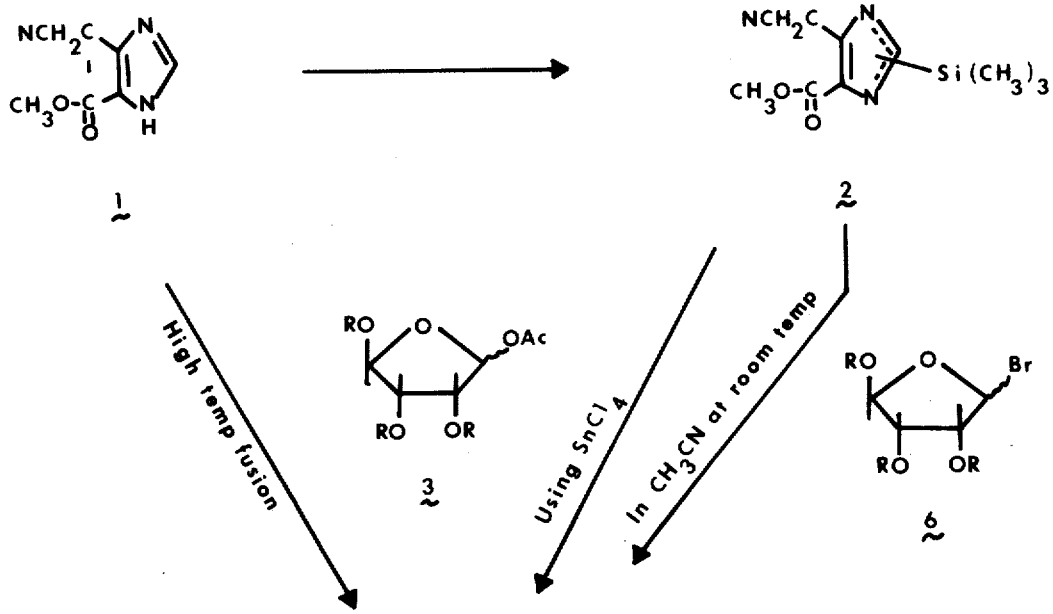

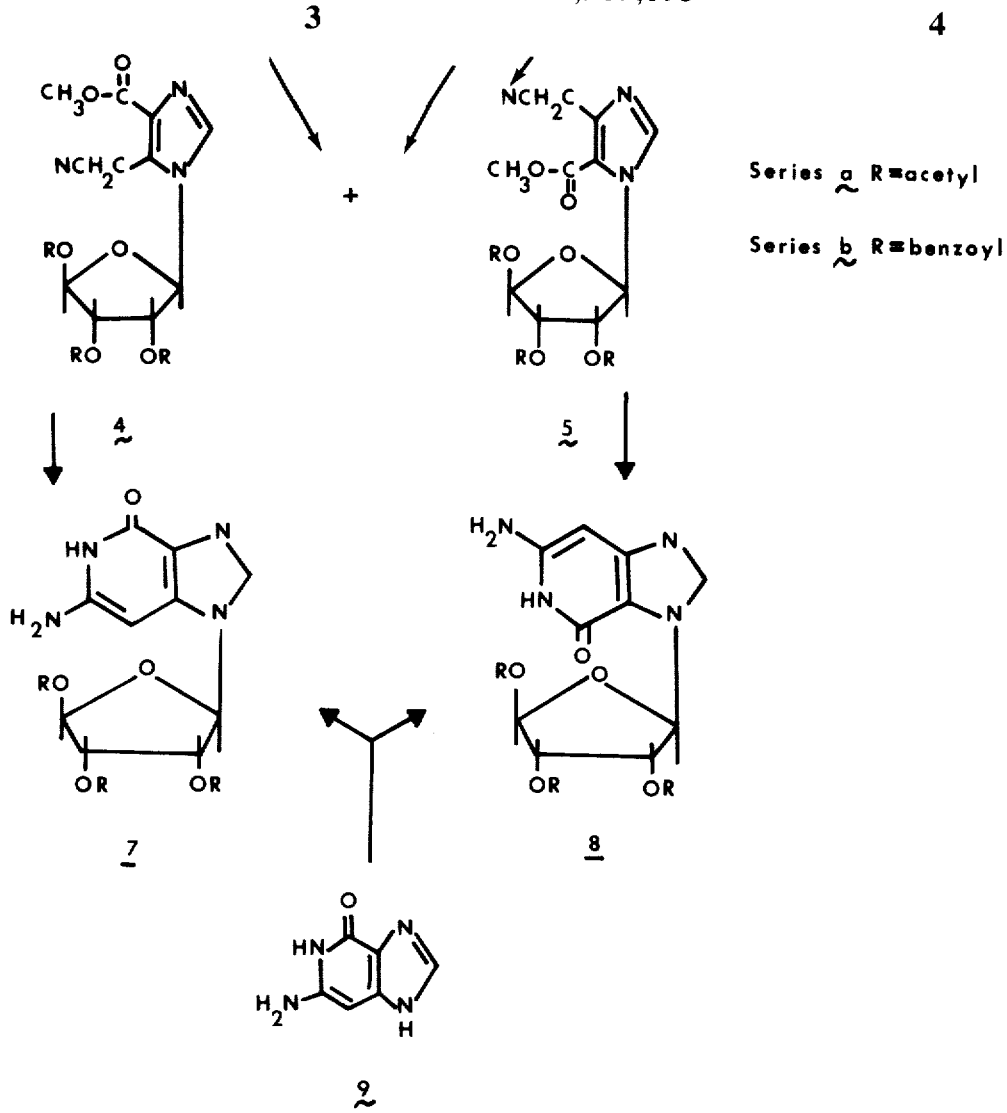

EXAMPLE I

4-Methoxycarbonyl-1-(β-D-2''',3',5'-tri-O-acetyl or benzoyl ribofuranosyl)-imidazole-5-acetonitrile (Compound 4) and 5-Methoxycarbonyl-1-(β-D-2',3',5',-tri-O-acetyl or benzoyl ribofuranosyl)-imidazole-4-acetonitrile (Compound 5)

Process I: 5(4)-Methoxycarbonylimidazole-4(5)-acetonitrile (Compound 1) (1.86 g, 11 mmoles) was thoroughly mixed with 1,2,3,5-O-tetraacetylribose (Compound 3 (4.77 g, 15 mmoles), and the mixture was heated with stirring to melt in an oil bath (170°) and was maintained at this temperature for ~ 7–8 minutes. Chloroacetic acid (200 mg) was added to the above heated and stirred solution. The bath temperature was raised rapidly to ~190° (~5 minutes) and the reaction mixture was subjected to high vacuum while these conditions were maintained for another 20 minutes.

The brownish-black product was extracted with benzene (3 × 75 ml), filtered, and the filtrate was washed with saturated Ha$_2$CO$_3$ solution solution (3 × 40 ml) followed by H$_2$O (3 × 50 ml.). The benzene layer (pale yellow was dried over MgSO$_4$, filtered and evaporated to obtain yellow gum. The gum was taken up in CHCl$_3$ and was subjected to sillcic acid column chromatography. The column was washed with CHCl$_3$ followed by increasing proportions of MeOH in CHCl$_3$. The product containing fractions were pooled and evaporated. The residual foam was crystallized from MeOH to obtain white needles of Compound 5a (1.7 g), $\lambda_{max}^{pH\ 7\ \&\ 11}$ 242 mμ, mp 92°–93°, pmr (in CDCl$_3$) δ6.45 (1,d, H'J$_{H_1'-H_2'}$=2.5 Hz).

Anal. C$_{18}$H$_{21}$N$_3$O$_9$ requires: C, 51.06; H, 5.00; N, 9.93. Found: C, 51.23; H, 5.03; N, 9.90.

A minor product (less than 10%) (Compound 4a) was isolated from the mother-liquor by prep TLC and found to have uv absorption at $\lambda_{max}$ 235mμ(MeOH and OH) and pmr spectrum (in CDCl$_3$) 5.95 (1,d,H$_1$'J-H'J$_{H_1'-H_2'}$=4 Hz).

The same procedure was applied using 2,3,5-tri-O-benzoyl-1-O-acetylribofuranose (Compound 3b) and it also gave a mixture of two possible isomers (Compound 4b and 5b) (as determined by the pmr spectra) in an overall yield of 47%.

Process II: Compound 1 (1.65 g, 10 mmoles) was heated under reflux for 18 hr with hexamethyldisilazane (25 ml) and (NH$_4$)$_2$SO$_4$ (50 mg), maintaining the anhydrous conditions. Excess of hexamethyldisilazane was removed, and the product (Compound 2) was obtained as yellow oil. It was taken in dichloroethane (200 ml) and tetraacetylribose (3.18 g, 10 mmoles) was added, followed by SnCl$_4$ (0.8 ml). The reaction mixture was kept at room temperature for 6 hr with vigorous stirring. Saturated Na$_2$CO$_3$ solution was then added and the mixture was then stirred for another half hour. The organic phase was further washed with Na$_2$CO$_3$ solution (50 ml) followed by H$_2$O (3 × 50 ml) and was dried over MgSO$_4$, filtered and evaporated to obtain yellow gum. This gum was dissolved in CHCl$_3$ and was purified as in Process 1 to obtain Compounds 4a and 5a in 57% yield. The ratio of Compounds 4a and 5a was 2ml as determined by uv absorption.

Similarly when this process was repeated using 2,3,5-tri-O-benzoyl-1-O-acetylribofuranose (Compound 3b), the isomeric mixture of the products 4b and 5b was obtained in over 60% yield as white foam. The ratio of 4b to 5b was 5:1.

Anal.: C$_{33}$H$_{27}$N$_3$O$_9$ requires: C, 65.02; H, 4.46; N, 6.89. Found: C, 64.87; H, 4.67; N, 6.63.

Process III: Compound 2 (10 mmoles), as obtained in Process II above, was dissolved in CH$_3$CN (100 ml), 2,3,5-tri-O-acetylribofuranosylbromide (Compound 6a) (10 mmoles) dissolved in CH$_3$CN (25 ml) was added, and the reaction mixture was stirred at room temperature in a tightly stoppered flask for 3 days. At the end of this period, MeOH (10 ml) was added and the reaction mixture was evaporated under vacuum. The yellow gum so obtained was purified as in Process I to obtain a mixture of Compounds 4a and 5a (in a ratio of 1:8, respectively) in 55% yield.

The process was repeated using 2,3,5-tri-O-benzoyl-ribofuranosylbromide (Compound 6b) to obtain the products, Compounds 4b and 5b.

EXAMPLE II

6-Amino-1-(β-D-ribofuranosyl)-imidazo(4,5-c)pyridine-4-one (Compound 7) (3-deazaguanosine) and 6-Amino-3-(β-D-ribofuranosyl)-imidazo[4,5c]pyridine-4-one (Compound 8)

Process I: Compound 5a (846 mg, 2 mmoles) was dissolved in anhydrous MeOH (200 ml) and the solution was saturated with ammonia at 4°. The reaction mixture was stirred at room temperature in a tightly stoppered flask for 2 days. It was then evaporated under vacuum carefully and co-evaporated with EtOH/MeOH to remove the last traces of ammonia. The residue was extracted with CHCl$_3$ (4 × 20 ml) and solid was recrystallized from H$_2$O to give 310 mg (55%) of Compound 8, mp 247°–250°, $\lambda_{max}^{pH\ 1}$ 278 and 320, $\lambda_{max}^{pH\ 7}$ 259 and 325 and $\lambda_{max}^{pH}$ 322.

Anal. C$_{11}$H$_{14}$N$_4$O$_5$ requires: C, 46.81; H, 5.00; N, 19.85. Found C, 47.03; H, 5.06; N, 19.84.

An identical product was obtained in 42% yield when Compound 5b was subjected to similar reaction conditions. Product 8 was also obtained by heating either Compound 5a or 5b in liquid ammonia at 110°–120° for 10–12 hr in a steel bomb.

Similarly, Compound 4a or 4b was converted to Compound 7 in 45–50% yield using either MeOH/Ammonia at room temperature or liquid ammonia at 110°–120°. The product was isolated by prep TLC (cellulose F plates, developed in CH$_3$CN:H$_2$O 7/3 V/V), and has uv absorption $\lambda_{max}^{ph\ 1}$ 284 and 315 (sh), $\lambda_{max}^{ph\ 7}$ 270 and 305 (sh), $\lambda_{max}^{pH\ 11}$ 268 and 296 (sh). M.P. 264° C.

Anal. C$_{11}$H$_{14}$N$_4$O$_5$: Cal'c. C, 46.81; H, 5.00; N, 19.85. Found: C, 46.68; H, 5.12; N, 19.61.

Process II: 6-Aminoimidazo(4,5-c)pyridine-4-one (3-deazaguanine) (Compound 9), prepared as described in the application of Robert J. Rousseau et al., entitled "3-Deazaguanine", Ser. No. 577,078 filed July 6, 1973 assigned to the same assignee as this application, (150 mg, 1 mmole) was heated under reflux in the presence of hexamethyldisilazane (10 ml) and (NH$_4$)$_2$SO$_4$ (~10 mg) for 18 hr. Excess of hexamethyldisilazane was removed under vacuum, and the residue was taken up in CH$_3$CN (50 ml). Compound 6a (340 mg, 1 mmole) also dissolved in CH$_3$CN (10 ml) was added and the reaction mixture was stirred at room temperature for 3 days under anhydrous conditions. At the completion of the reaction, MeOH (5 ml) was added, and the reaction was stirred for another 10 minutes. It was then evaporated and redissolved in MeOH which was saturated with ammonia and was left at room temperature overnight. Thin layer chromatography revealed a number of uv absorbing products, two of which correspond to compound 7 and compound 8. The uv absorption spectra of these two products was also identical to compounds 7 and 8. 3-Deazaguanosine may also be prepared by enzymatic conversion of 3-deazaguanine, as set forth in Example III which follows.

EXAMPLE III

The incubation samples contained, in a final volume of 1.0 ml., 1M tris HCl buffer (pH 7.5), 0.5 ml), ribose-1-phosphate decyclohexylammonium salt, 10nM aqueous solution (0.125 ml), 3-deazaguanine, 1mM aqueous solution (0.125 ml), 0.03 ml of enzyme suspension (calf spleen nucleoside phosphorylase from Sigma Chemical Co., St. Louis, Mo.) and distilled water (0.22 ml).

The samples were incubated at 25°C. The uv spectra, as recorded on a Cary 14 spectrophotometer, was scanned every 5 minutes to follow the change in absorption. After 20 minutes, no further change was detected. The $\lambda_{max_1}$ (pH 7.5) shifted from 262 nm to 270 nm, and with an increase in the extinction coefficient, the $\lambda_{max_2}$ peak at 298 nm (pH 7.5) became a shoulder. The highest rate of conversion to the nucleoside was found when the concentration of 3-deazaguanine was (1 ¼ 10$^{-4}$ M, the concentration of ribose-1-phosphate was 3 × 10$^{-4}$ to 1 × 10$^{-3}$ M, and the concentration of nucleoside phosphorylase was 60–90 mg/ml in the reaction mixture.

To further confirm that the product thus obtained is 3-deazaguanosine, the following work was also performed. 3-Deazaguanine (4.5 mg. 0.5 mmoles) was dissolved in 0.5 M TRIS.HCl buffer pH = 7.5 (300 ml). Ribose-1-phosphate dicyclohexylammonium salt (42.8 mg, 0.1 mmoles) and nucleoside phosphorylase 6 mg, 24 unit/mg) was added, and the reaction was stirred at 25° C for 2 hr. The pH of the solution was adjusted to 4.5 with HCl, and it was then passed through a 1 × 3 cm charcoal column (100–200 mesh). The column was washed with H$_2$O (200 ml), and the product was then eluted with ethanol-H$_2$O conc. NH$_4$OH (45:45:10) (300 ml). The eluent was evaporated to dryness in vacuo, leaving an amorphous, light-green material. Yield: 8.1 mg (95%), which was proven to be identical with the synthetic 3-deazaguanosine of Example II (Compound 7) by uv spectrum and tlc.

In general, 3-deazaguanine may be converted enzymatically to 3-deazaguanosine by reaction with the enzyme Nucleoside Phosphorylase at a pH within the range of about 5 to about 9, preferably 7 to 8, at an enzyme concentration of from about 0.05 to about 0.5 mg/ml, preferably about 0.05 to about 0.1 mg/ml, and a temperature within the range of about 0° to about 50°C, with the preferred temperature being approximately 25 to about 35°C. Satisfactory results have been obtained when 3-deazaguanine is present in a concentration greater than 5¼10$^{-5}$ M, preferably about 1¼10$^{-4}$ M, and ribose-1-phosphate is present at a concentration of about 3¼ × 10⁻⁴ to about 1¼ × 10⁻³ M. Generally about 0.1 to about 2 hours, preferbly about 0.5 to about 1 hours, are required for the reaction. The source of the enzyme may be animal, tissue or bacteria. The principal bacterial sources are *E. coli* and yeast, while a variety of animal sources exist, including beef spleen, rat liver, calf liver, calf thymus, beef liver, monkey brain, horse liver, calf spleen, human erythrocytes, fish skin and fish muscle. This enzyme may be a purified protein or may be present in actively metabolizing bacterial or fungal cells. Being present in actively metabolizing bacterial or fungal cells it is expected that fermentation processes using these cells or mutants of these cells may lead to the production of 3-deazaguanosine from 3-deazaguanine.

EXAMPLE IV

In this example, compounds 7 and 8 were tested to determine their in vitro antiviral efficacy, using the virus-induced cytopathogenic effect (CPE) method of Sidwell, et al. (Applied Microbiology 22:797–801, 1971). Briefly, the CPE procedure includes the dissolution of the antiviral agent in a cell culture medium consisting of vitamins, amino acids, serum, buffer, penicillin, streptomycin and indicator dye in water. The virus suspended in the cell culture medium was added to an established monolayer of KB cells, and an equal volume of the antiviral agent was then added within 15 minutes. The infected treated cells were graded following microscopic examination. Controls for each experiment include cell controls (cells and cell culture medium only), virus controls (cells and virus and cell culture medium) and toxicity controls (cells and chemical and cell culture medium).

The virus rating (VR) system of Sidwell et al., described in Applied Microbiology, supra, was used to evaluate the degree of significance of CPE inhibition. A VR greater than 0.5 is indicative of significant antiviral activity and a VR of less than 0.5 suggests slight antiviral activity.

The results of in vitro testing are shown in Table I.

TABLE I

IN VITRO ANTIVIRAL ACTIVITY OF 3-DEAZAGUANOSINE AND 6-AMINO-3-β-D-RIBOFURANOSYLIMIDAZO[4,5-c]PYRIDIN-(5H)4-ONE

| Virus | Compound 7 (VR) | Compound 8 (VR) |
|---|---|---|
| Type 1 Herpes simplex | 1.0 | 0.4 |
| Type 3 Adeno | 0.8 | 0.0 |
| Type 13 Rhino | 0.7 | 0.1 |
| Type 3 Parainfluenza | 0.5 | 0.0 |
| Vaccinia | 0.9 | 0.2 |
| Cytotoxicity* - KB cells | 1.0 | 10 |

*Cytotoxicity expressed as the dose (μg/ml) causing no visible changes to the cells when examined microscopically after exposure to the compound for 72 hr at 37°C. KB cells: Human carcinoma of the nasopharynx.

The 2′-O-acylated (e.g. $C_1$–$C_{16}$ acyl) analogs may be secured by reaction of the free nucleosides with corresponding acid anhydrides or acyl halides, e.g., acetic anhydride, acetyl chloride, propionyl chloride, propionic anhydride, butyric anhydric, butyryl chloride, valeryl chloride, valeric anhydride, heptanoic anhydride, heptanoyl chloride, hexanoyl chloride, hexanoic anhydride, oxtanoyl chloride, octanoic anhydride, palmitoyl chloride and palmitic anhydride, etc., in base as described in a general synthesis by Falbriard, et al., Biochim. et Biophys. Acta, 148, 99 (1967).

It will also be appreciated that additional experimental examples could be given herein of the compounds of this invention, both as to preparation and activity, but will not, for the sake of brevity of disclosure, since the art skilled will readily appreciate and understand the full scope of the invention given the disclosure herein.

We claim:

1. A compound of the structure:

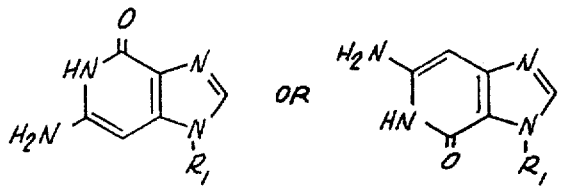

wherein $R_1$ is β-D-ribofuranose or 2′,3′,5′-O-$C_1$ to $C_8$ acylated analogs thereof.

2. 6-Amino-1-(β-D-ribofuranosyl)imidazo(4,5-c)pyridine-4-one.

3. 6-Amino-3-(β-D-ribofuranosyl)imidazo(4,5-c)pyridine-1-one.

4. A process for preparing 6-amino-1-(β-D-ribofuranosyl)-imidazo(4,5-c)pyridine-4-one and 6-amino-3-(β-D-ribofuranosyl)-imidazo(4,5-c)pyridine-4-one comprising:

A first reaction step in which 5(4)-methoxycarbonylimidazole-4(5)-acetonitrile is reacted with a protected ribofuranose in the presence of an acid catalyst at a temperature of from about 160°C to about 200°C to form 4-methoxycarbonyl-1-(β-D-2′,3′,5′-tri-O-acylribofuranosyl)-imidazo-5-acetonitrile and 5-methoxycarbonyl-1-(β-D-2′,3′,5′-tri-O-acylribofuranosyl)-imidazole-4-acetonitrile; and a second reaction step wherein the products of the first reaction step are reacted with ammonia at from about 20°C to about 150°C.

5. The process of claim 4 wherein when said acid catalyst is chloroacetic and said temperature is from about 160°C to about 190°C.

6. The process of claim 4 in which said ammonia is present as liquid ammonia.

7. The process of claim 6 in which said ammonia is dissolved in an aliphatic alcohol.

8. A process for preparing 6-amino-1-(β-D-ribofuranosyl)-imidazo(4,5-c)pyridine-4-one and 6-amino-3-(β-D-ribofuranosyl)-imidazo(4,5-c)pyridine-4-one comprising:

a first reaction step in which 5(4)-methoxycarbonylimidazole-4(5)-acetonitrile is reacted with hexamethyldisilizane at refluxing temperature to form a silylated product;

a second reaction step in which said silylated product is reacted with a protected ribofuranose in the presence of a Lewis acid catalyst and a nonhydroxylated solvent at from about 20°C to refluxing temperature to form 4-methoxycarbonyl-1-(β-D-2′,-

3',5'-tri-O-acylribofuranosyl)-imidazole-5-acetonitrile and 5-methoxycarbonyl-1-(β-D-2',3',5'-tri-O-acylribofuranosyl)-imidazole-4-acetonitrile; and a third reaction step wherein the products of the second reaction step are reacted with ammonia at from about 20°C to about 150°C.

9. The process of claim 8 in which said Lewis acid catalyst is stannic chloride, said solvent is 1,2-dichloroethane and said temperature is from about 20°C to about 25°C.

10. The process of claim 8 in which said first reaction step is carried out in the presence of ammonium sulfate as a catalyst.

11. The process of claim 8 in which said ammonia is present as liquid ammonia.

12. The process of claim 8 in which said ammonia is dissolved in aliphatic alcohol.

13. A process for preparing 6-amino-1-(β-D-ribofuranosyl)-imidazo(4,5-c)pyridine-4-one and 6-amino-3-(β-D-ribofuranosyl)-imidazo(4,5-c)pyridine-4-one comprising:

a first reaction step in which 5(4)-methoxycarbonyl-imidazole-4(5)-acetonitrile is reacted with hexamethyldisilizane at refluxing temperature to form a silylated product;

a second reaction step in which the silylated product thus formed is reacted with a $C_1$ to $C_8$ acyl protected ribofuranosyl halide in the presence of a non-hydroxylated solvent at from about 20°C to refluxing temperature to form 4-methoxy-carbonyl-1-(β-D-2',3',5'-tri-O-acylribofuranosyl)-imidazole-5-acetonitrile and 5-methoxycarbonyl-1-(β-D2',3',5'-tri-O-acylribofuranosyl)-imidazole-4-acetonitrile; and a third reaction step wherein the products of the second reaction step are reacted with ammonia at from about 20°C to about 150°C.

14. The process of claim 13 in which said first reaction step is carried out in the presence of ammonium sulfate as a catalyst.

15. The process of claim 13 in which said solvent in said second reaction step is acetonitrile and said temperature is from about 20°C to about 25°C.

16. The process of claim 13 in which said ammonia is present as liquid ammonia.

17. The process of claim 14 in which said ammonia is dissolved in an aliphatic alcohol.

* * * * *